Nov. 24, 1964  J. F. SWIFT  3,157,995
HYDROMECHANICAL POWER TRANSMISSION
Filed July 11, 1962  12 Sheets-Sheet 1
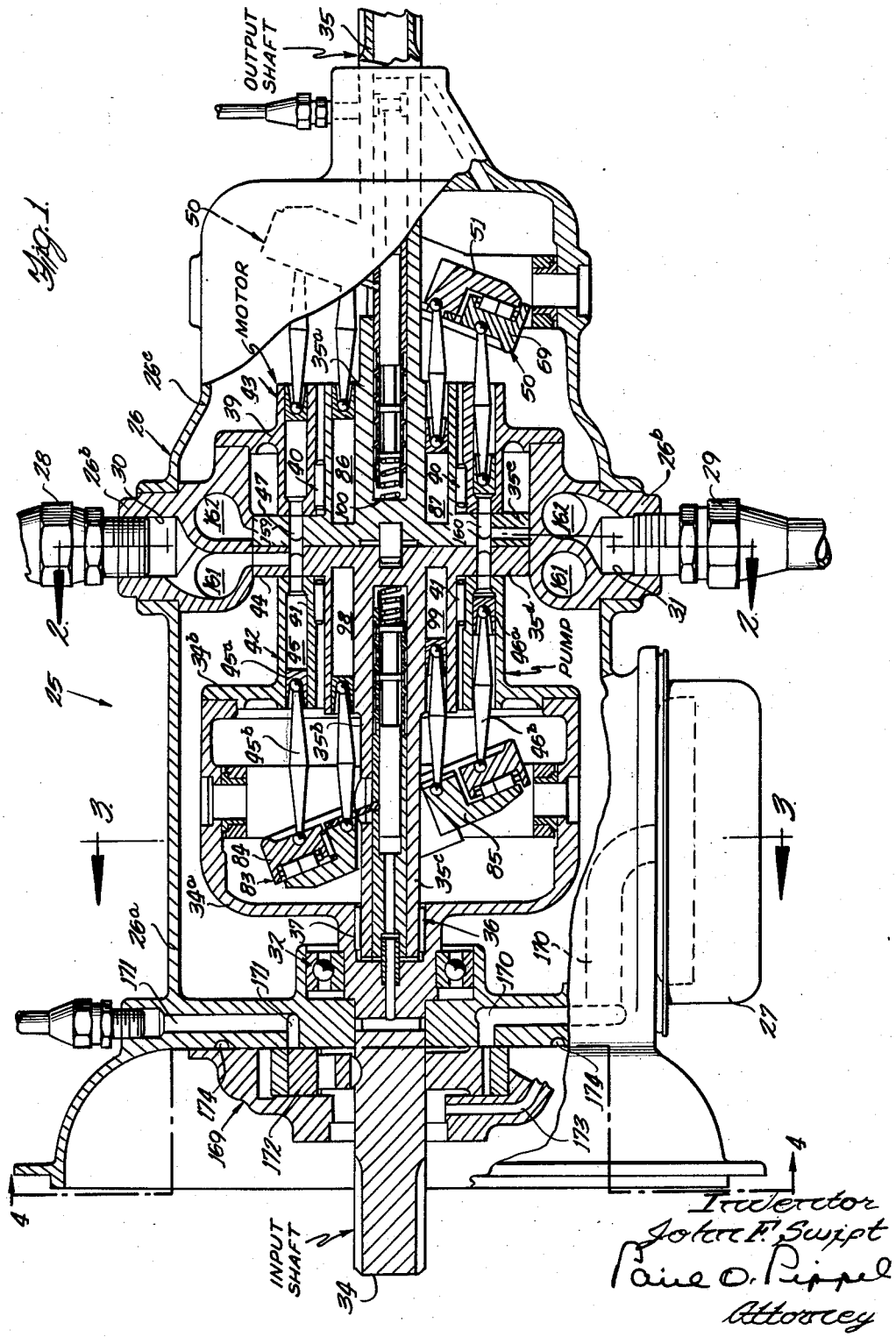

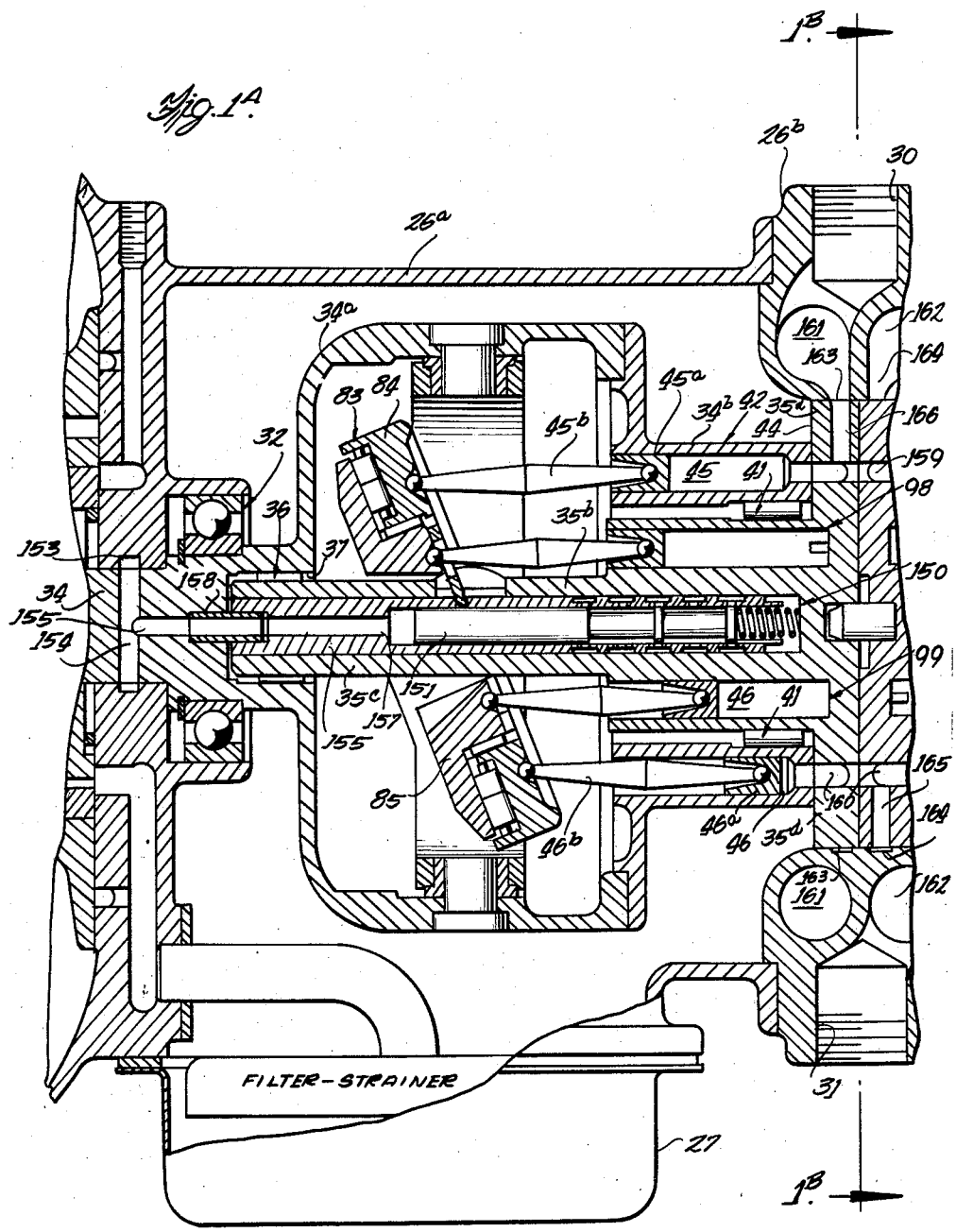

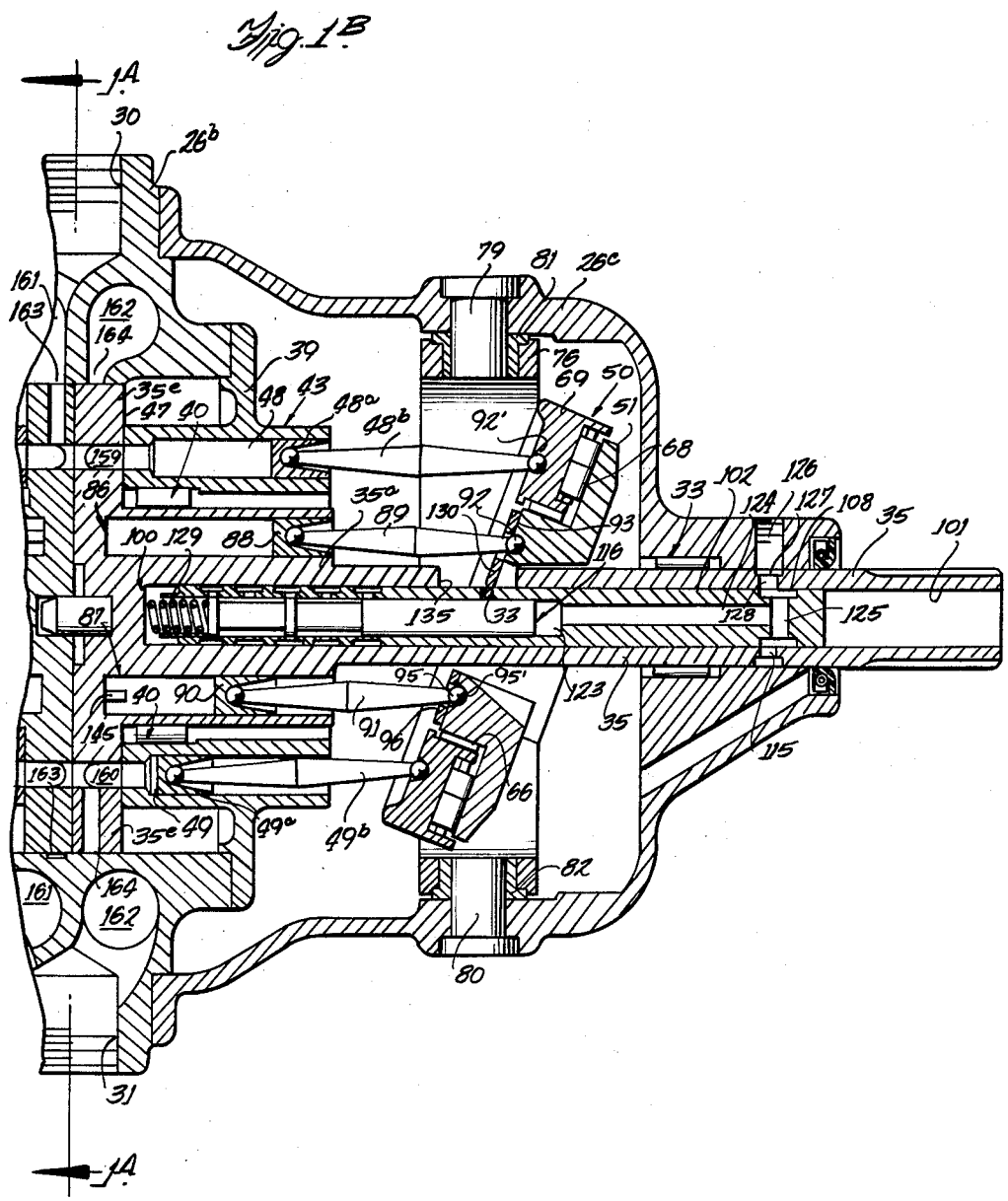

Nov. 24, 1964     J. F. SWIFT     3,157,995

HYDROMECHANICAL POWER TRANSMISSION

Filed July 11, 1962     12 Sheets-Sheet 4

Inventor
John F. Swift
Paul O. Pippel
Attorney

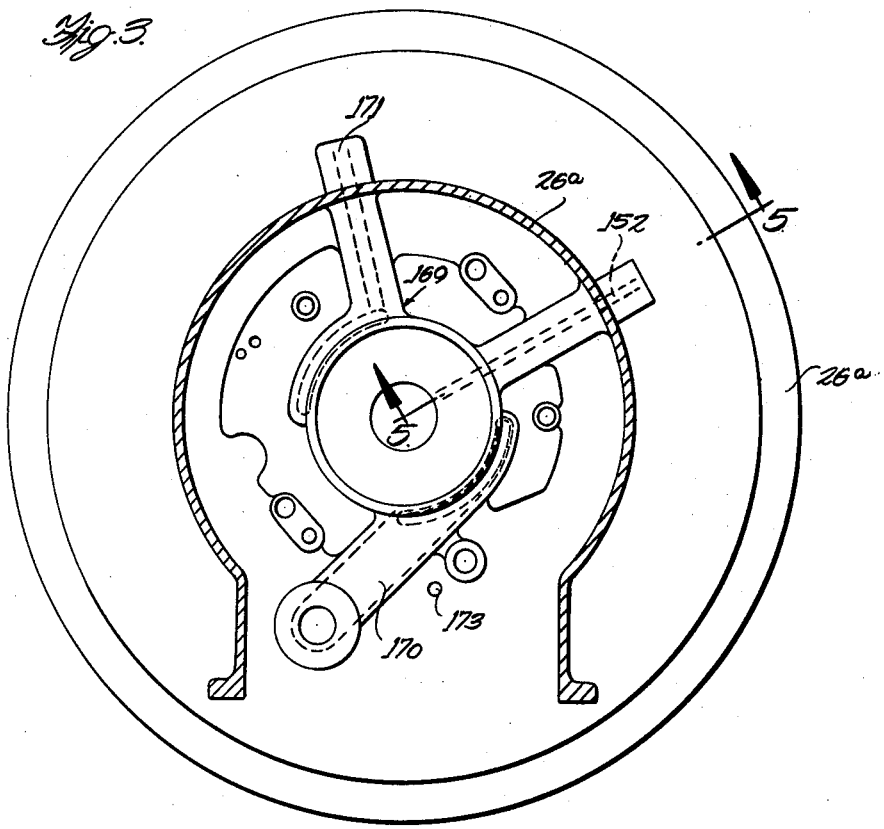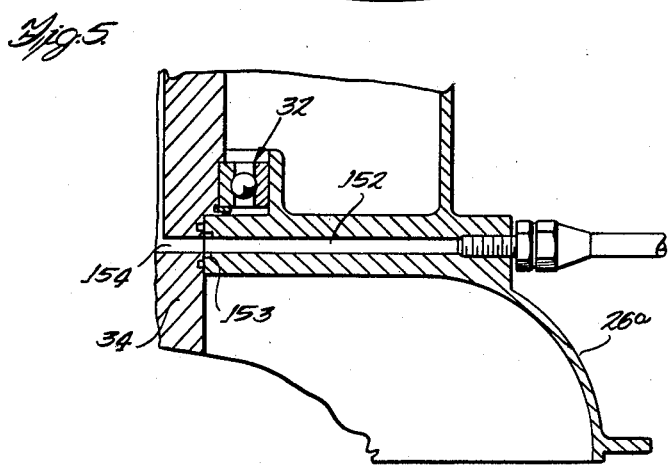

Nov. 24, 1964  J. F. SWIFT  3,157,995
HYDROMECHANICAL POWER TRANSMISSION
Filed July 11, 1962  12 Sheets—Sheet 6

Inventor
John F. Swift
Paul O. Pippel
Attorney

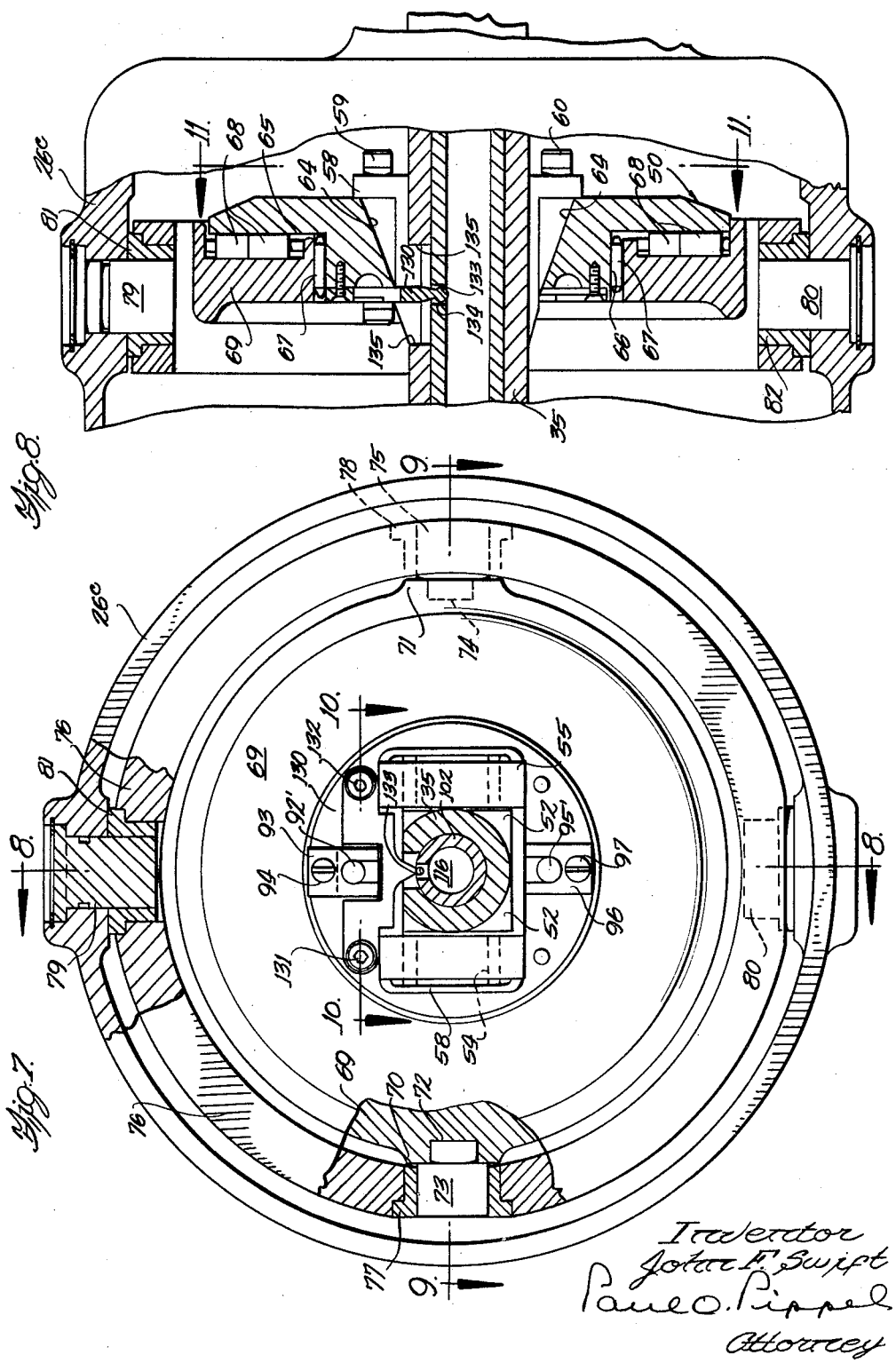

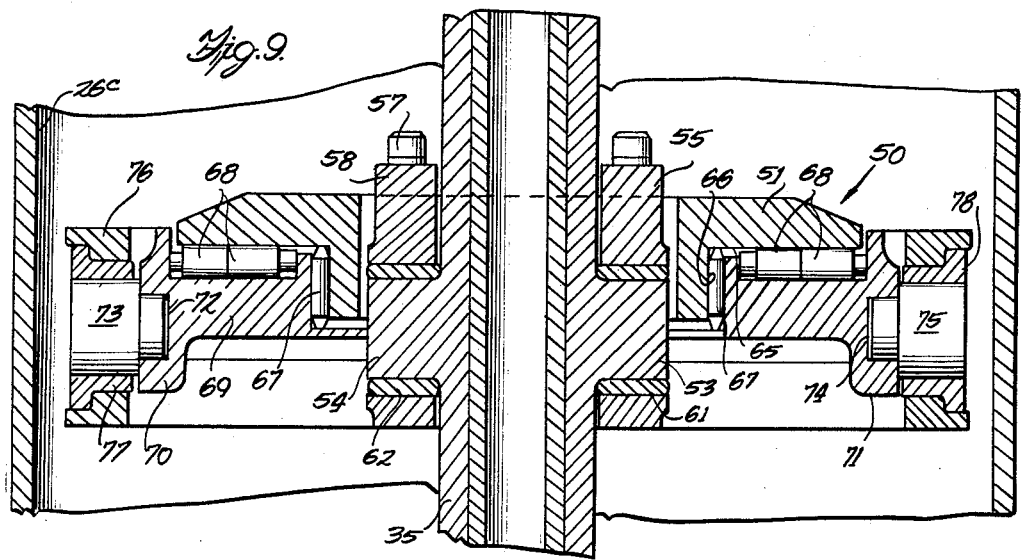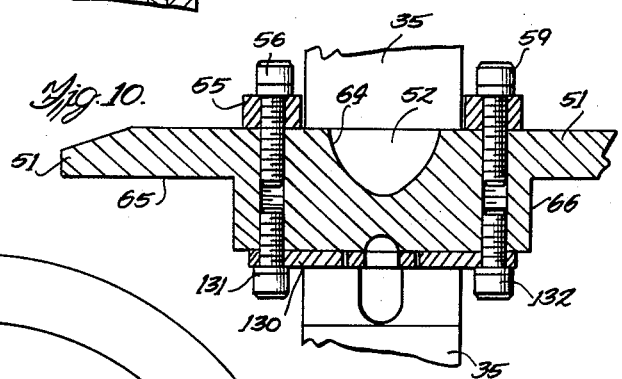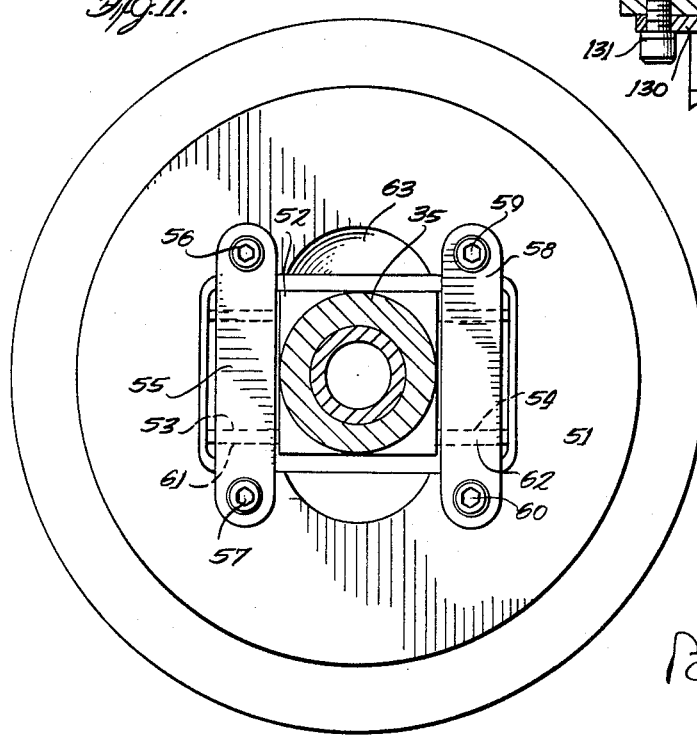

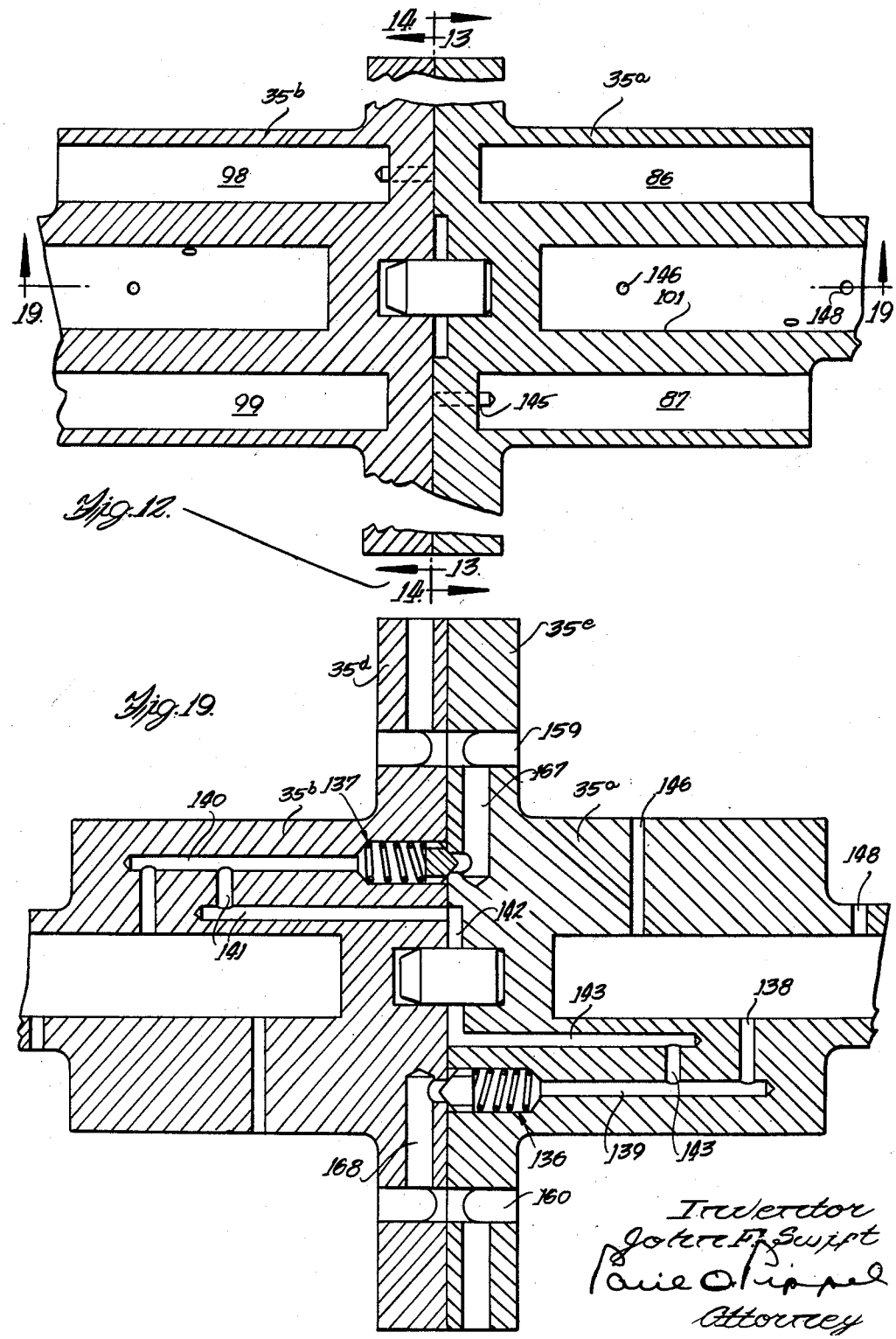

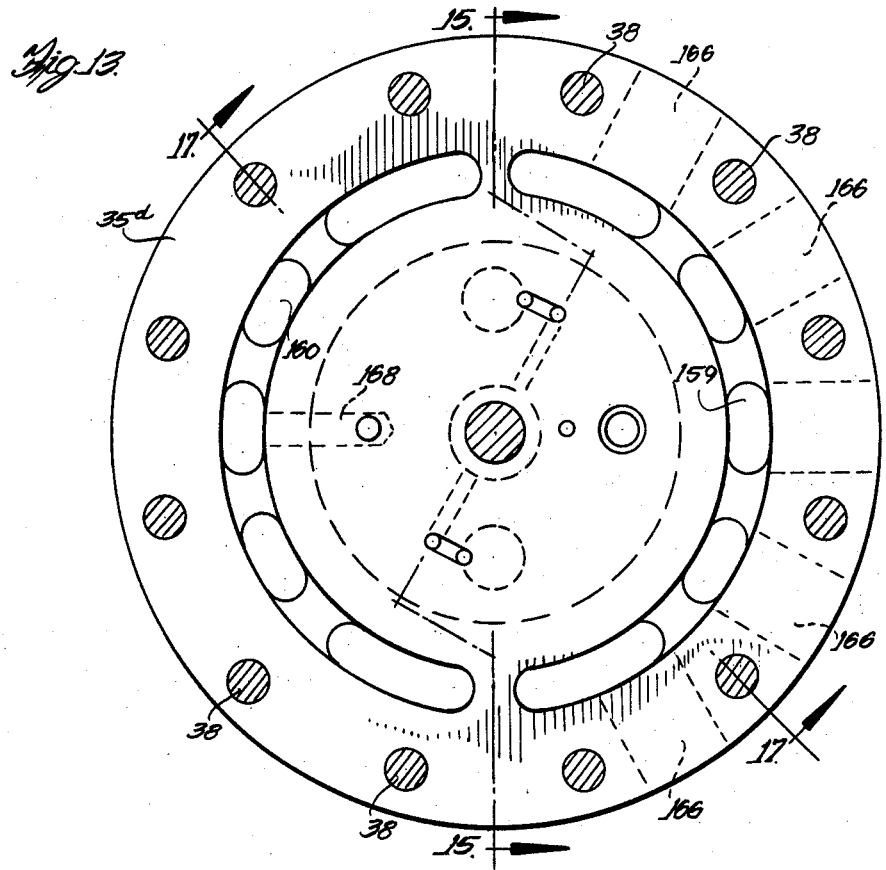
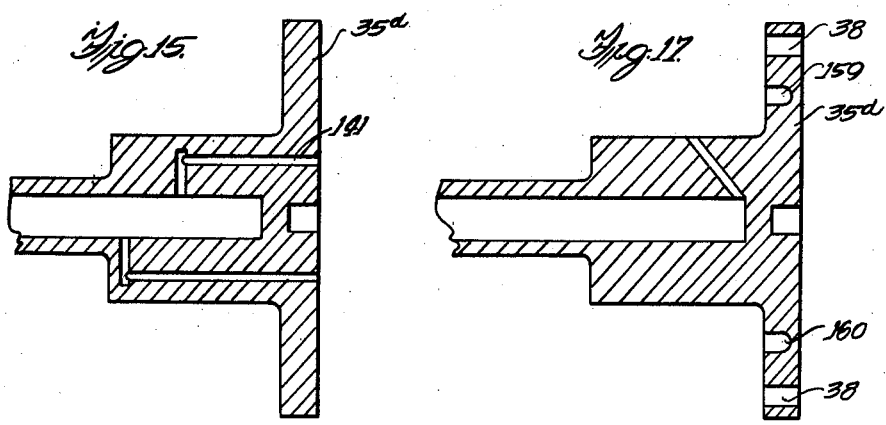

Nov. 24, 1964     J. F. SWIFT     3,157,995
HYDROMECHANICAL POWER TRANSMISSION
Filed July 11, 1962     12 Sheets-Sheet 11
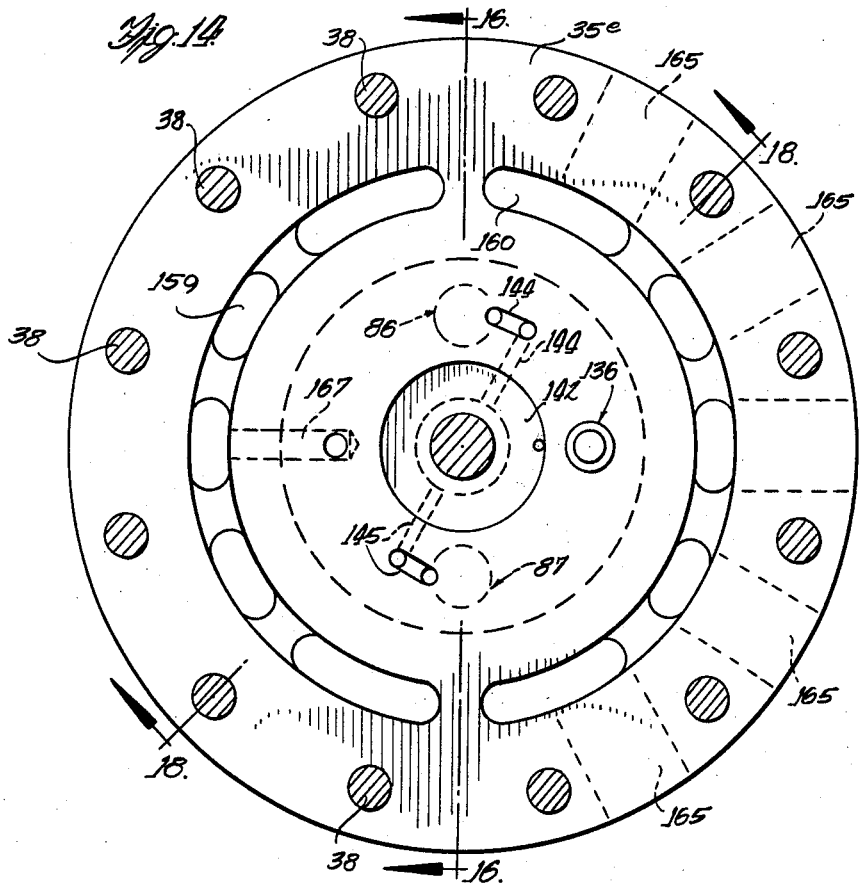
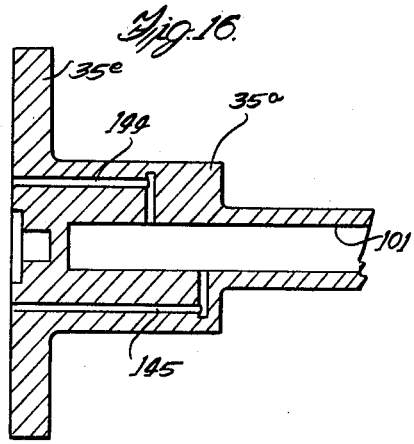
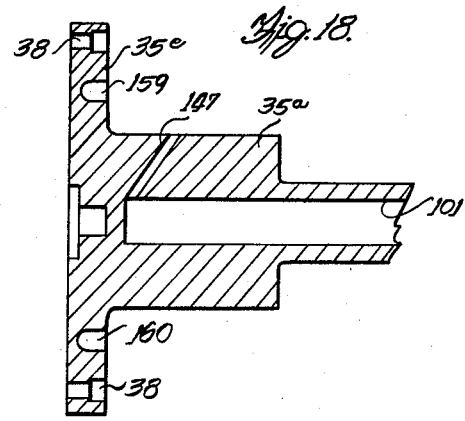
Inventor
John F. Swift
Paul O. Pippel
Attorney

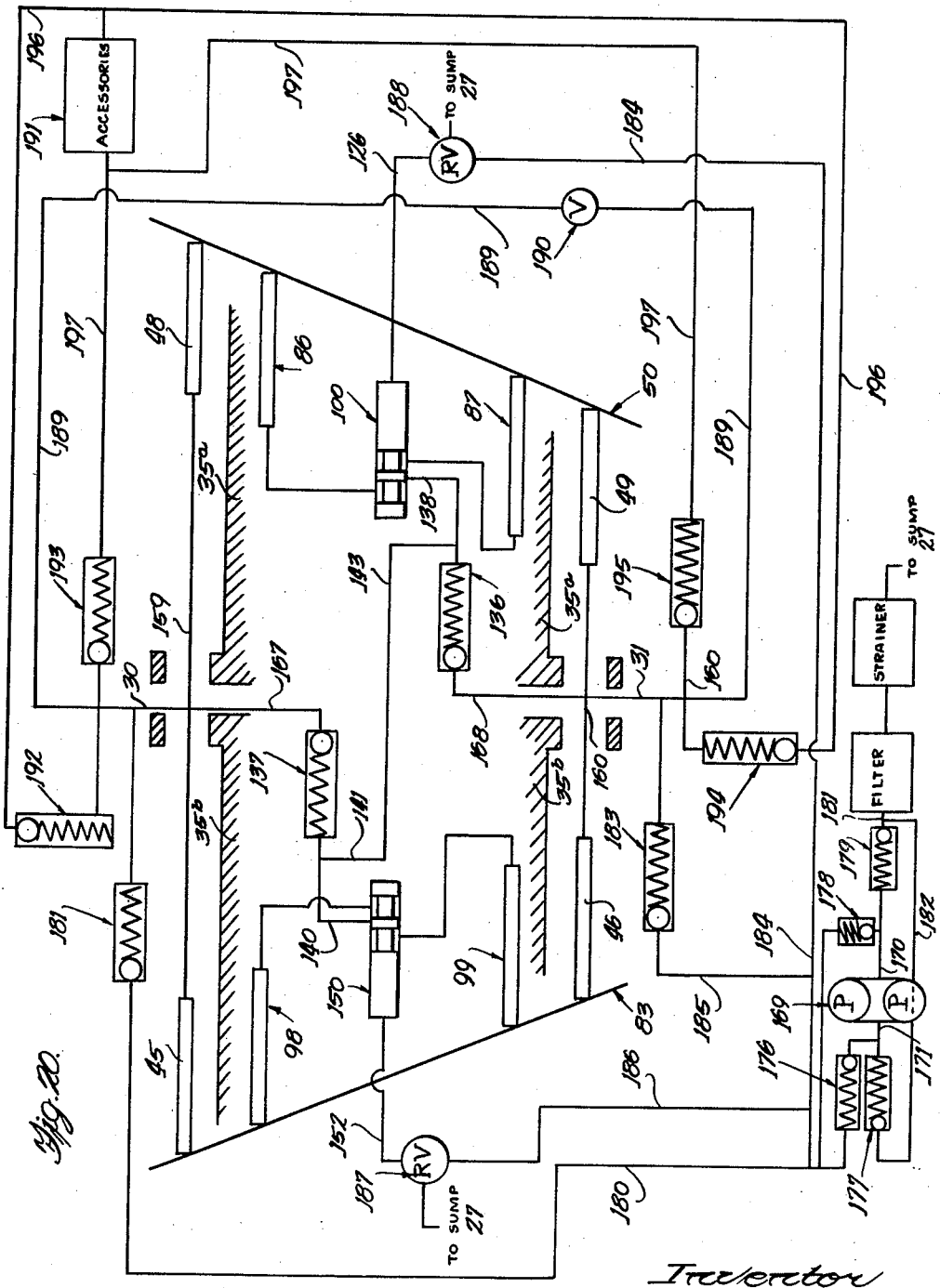

United States Patent Office 3,157,995
Patented Nov. 24, 1964

3,157,995
HYDROMECHANICAL POWER TRANSMISSION
John F. Swift, Chicago, Ill., assignor to International
Harvester Company, Chicago, Ill., a corporation of
New Jersey
Filed July 11, 1962, Ser. No. 209,149
11 Claims. (Cl. 60—53)

This invention relates to an infinitely variable speed ratio hydromechanical power transmission. More in particular this invention relates to a hydraulic remote controlled compact hydromechanical power transmission having improved means for independently controlling the inclination of each swash plate hydraulically and also improved means for supporting the thrust ring on each swash plate.

Hydromechanical transmissions differ from hydrostatic transmissions in at least one major respect. Contrary to that of a hydrostatic transmission a hydromechanical transmission divides the power train into two separate paths, one being mechanical and the other hydrostatic. When the transmission is in 1:1 speed ratio forward (i.e., direct drive) the power transmitted hydrostatically is zero as the unit is hydraulically locked and thus the entire transmission of power is mechanical. At other speed ratios the power transmitted is partly hydrostatic and the balance mechanical.

Hydromechanical transmissions of the type described herein have a piston type hydraulic pump connected to at least one piston type hydraulic motor. It is extremely advantageous if the swash plates governing the piston displacements of the pump and motor are independently variable. However, due primarily to necessary details of construction requiring that the rotating members be dynamically balanced, the design of suitable control means for remotely regulating the inclination of each swash plate presents a most difficult problem. A dynamically unbalanced unit is limited to lower speeds as at high speeds serious vibration arises which imposes excessive strain on the bearings and tends to be noisy in operation. It is a prime object of the present invention to provide an improved control means for regulating the inclination of each swash plate independently.

A further object of the present invention is to provide a hydraulically operated control means for regulating the position of each swash plate, wherein the pressure for accomplishing the regulating is derived from the hydromechanical transmission power circuit, regardless of forward or reverse, drive or coast, conditions of operation.

A still further object of this invention is to provide a hydraulically operated control means, adapted for remote signaling operation, to regulate the inclination of each swash plate.

Yet a further object of this invention is to provide a hydraulically operated control means according to the preceding objects wherein the control means is provided with an automatic follow-up means for maintaining the inclination of each swash plate at a selected angle.

Another important object of the invention is to provide each swash plate with a thrust ring which is supported by means other than the swash plate and serves to eliminate one undesirable force component from their respectively associated pistons.

Still another object of the present invention is to provide an improved manifold construction for the transmission's fluid power take-off to operate hydraulic accessories.

These and other desirable objects inherent in and encompassed by the invention will become more apparent from the ensuing description of a preferred embodiment, the appended claims, and the annexed drawings wherein:

FIGURE 1 is a vertical section taken through the longitudinal axis, partly broken away, of a hydromechanical transmission embodying the present invention;

FIGURE 1A is an enlarged view of the leftward half of the transmission shown in FIGURE 1 illustrating the transmission's hydraulic pump section more in detail;

FIGURE 1B is an enlarged view of the rightward half of the transmission shown in FIGURE 1 showing the hydraulic motor section more in detail;

FIGURE 3 is a transverse section taken along the line 3—3 of FIGURE 1 with the hydraulic pump and its associated swash plate removed illustrating the auxiliary charge pump and the pump swash plate hydraulic control fluid passages;

FIGURE 5 is a sectional view, partly broken away, taken on line 5—5 of FIGURE 3 showing a fluid pressure passage for controlling the inclination of the pump swash plate;

FIGURE 7 is a view of the motor swash plate looking in a rearward direction with the swash plate in vertical position, partly in section and broken away, illustrating a cardan joint arrangement for supporting the thrust ring associated with the swash plate;

FIGURE 8 is a sectional view, partly broken away, taken on line 8—8 of FIGURE 7 showing further details of the motor swash plate;

FIGURE 9 is a sectional view, partly broken away, taken on line 9—9 of FIGURE 7 showing additional details of the motor swash plate;

FIGURE 10 is a sectional view, partly broken away, taken on line 10—10 of FIGURE 7 illustrating details of the transverse pivot connection between the motor swash plate and the output shaft with the thrust ring removed;

FIGURE 11 is an end view taken on line 11—11 of FIGURE 8 illustrating further details of the transverse pivot connection between the motor swash plate and the output shaft;

FIGURE 12 is a longitudinal sectional view partly broken away, of the control piston and fluid distributor valve with the control pistons and valve therefor removed;

FIGURE 13 is a sectional view, partly broken away, taken on line 13—13 of FIGURE 12 showing the position of passages in the fluid distributor valve on the motor side;

FIGURE 14 is a sectional view, partly broken away, taken on line 14—14 of FIGURE 12 showing the position of passages in the fluid distributor valve on the pump side;

FIGURE 15 is a sectional view, partly broken away, taken on line 15—15 of FIGURE 13 illustrating additional passages on the pump side;

FIGURE 16 is similar to FIGURE 15 except that it illustrates additional passages on the motor side and is taken on line 16—16 of FIGURE 14;

FIGURE 17 is a sectional view, partly broken away, taken on line 17—17 of FIGURE 13 illustrating additional passages on the pump side;

FIGURE 18 is similar to FIGURE 17 except that it illustrates additional passages on the motor side and is taken on line 18—18 of FIGURE 14;

FIGURE 19 is a sectional view, partly broken away, taken on line 19—19 of FIGURE 12 illustrating passages and check valves; and FIGURE 20 is a schematic diagram of the hydraulic circuits associated with the preceding figures.

Figure 2:
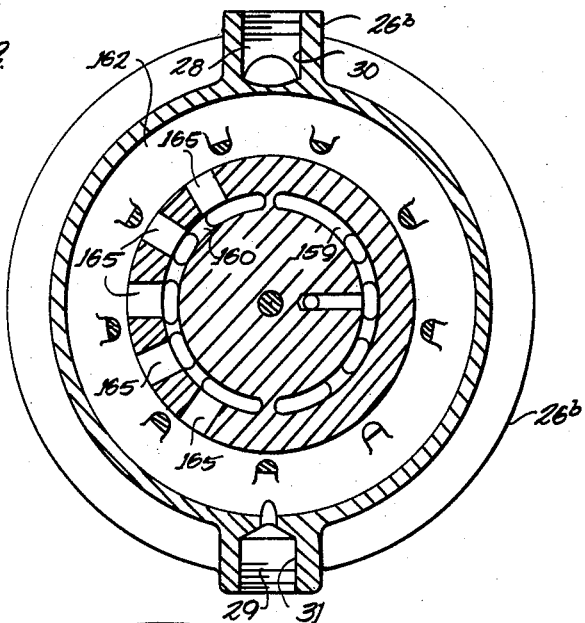
FIGURE 2 is a transverse section taken along the line 2—2 of FIGURE 1 illustrating details of the fluid distributor and fluid power take-off manifold.

With continued reference to the drawings the numeral 25 indicates generally a hydromechanical transmission embodying the present invention. The transmission 25 includes a stationary casing 26 which, for assembling purposes, may be conveniently comprised of a front section 26a, a fluid manifold 26b, and a rear section 26c all secured rigidly together as shown by conventional means such as by bolts (not shown). A portion of the front section 26a is provided with an opening at the bottom to which is rigidly secured a liquid reservoir or sump 27. The manifold 26b is provided with conduit couplings 28 and 29 in communication with manifold ports 30 and 31 respectively. One of the ports 30 or 31 is a fluid pressure power take-off from the transmission 25 for powering hydraulic accessories and the other port is the fluid return therefor. The manifold port 30 is at high pressure when the rotational power delivered into the transmission 25 is in one direction and the port 31 is at high pressure when the rotational power delivered is in the other direction.

In order to support the rotatable members of the transmission 25 the front section 26a of the casing 26 is provided with a conventional bearing generally indicated at 32 and the rear section 26c is provided with a conventional bearing 33 (FIGURE 1B) both bearings being axially aligned. If desired the bearings may be of the conventional thrust type.

The bearing 32 rotatably supports the input shaft 34 as shown in FIGURES 1 and 1A. Rigidly connected to and forming a part of the input shaft 34 is a rotatable bell-shaped housing 34a. The bell-shaped housing 34a in turn is rigidly connected, as by bolts (not shown), to a rotatable transmission pump multi-cylinder block 34b. Thus the bell-shaped housing 34a and the pump cylinder body 34b are constrained for rotation with the input shaft 34.

The rearward portion of the transmission 25 is provided with an output shaft 35 as seen in FIGURES 1 and 1B. The output shaft 35 includes a motor control body 35a. Rigidly connected to the motor control body 35a is a pump control body 35b which latter is provided with an extension shaft 35c supported by a conventional bearing 36 positioned in a cylindrical recess 37 on the rotatable bell-shaped housing 34a. The bodies 35a and 35b are rigidly secured together by a plurality of circumferentially disposed bolts 38 (FIGURES 13 and 14). Thus the extension shaft 35c, pump control body 35b, and motor control body 35a are constrained for rotation with the output shaft 35.

Referring now to FIGURES 1 and 1B, the hydraulic multi-cylinder motor block 39 is stationary and is secured to the manifold 26b of the outer casing 26 as by bolts (not shown). In order to further support or stabilize the output shaft 35 and its associated components 35a, 35b and 35c, a roller bearing 40 is disposed between the motor control body 35a and the motor cylinder block 39 as well as another roller bearing 41 disposed between the pump control body 35b and the pump cylinder block 34b.

It will be observed from FIGURES 1, 1A and 1B that the pump control body 35b is provided with a flange portion 35d connected to and abutting a flange portion 35e of the motor control body 35a.

The flanges 35d and 35e aggregately comprise a fluid distributor or valve means for communicating fluid between the multi-cylinder pump 42 and the multi-cylinder motor 43 which will be described more fully later herein.

The multi-cylinder hydraulic cylinder pump block 34b rotatable with the input shaft 34 is in abutting slidable relation with the face 44 of the flange 35d and comprises a plurality of circumferentially disposed pump cylinders, two of which are shown in FIGURES 1 and 1A at 45 and 46. Each of the pump cylinders are provided with a pump piston, two being shown at 45a and 46a, and respective connecting rods 45b and 46b.

The stationary multi-cylinder hydraulic cylinder motor block 39 is in abutting slidable relation with the face 47 of the flange 35e and comprises a plurality of circumferentially disposed motor cylinders, two of which are shown in FIGURES 1 and 1B at 48 and 49. Each of the motor cylinders are provided with a motor piston, two being shown at 48a and 49a, and respective connecting rods 48b and 49b. The means for varying the displacement or stroke of the pump and motor pistons will now be described.

Referring now to FIGURES 1, 1B and 7 through 11 it will be seen that a motor swash plate, generally indicated at 50, is provided. In FIGURES 1 and 1B the swash plate 50 is illustrated in an inclined position whereas in FIGURES 7 through 11 it is in the vertical position. Basically the swash plate 50 comprises a backing plate 51 which is supported by and constrained for rotation with the output shaft 35 but may swivel about a transverse axis thus permitting it to be shiftable from a perpendicular position (FIGURES 8 and 9) to an inclined position in either a clockwise direction (FIGURE 1) or a counterclockwise direction as may be desired. The swivel or transverse pivot connection of the backing plate 51 and the output shaft 35 will now be described.

It will be seen from FIGURES 7 and 11 that the output shaft 35 is provided with a portion having a rectangular cross-section 52. One pair of opposite faces of the portion 52 is provided each with a transversely extending stub shaft 53, 54 as best seen in FIGURE 9 and in dotted lines in FIGURES 7 and 11. Journalled for rotative movement about the axis of stub shaft 53 is a lug member 55 which is rigidly secured to the rearward side of the backing plate 51 by bolts 56 and 57 as indicated in FIGURES 9, 10 and 11. Similarly a lug member 58 is journalled for rotative movement about the axis of stub shaft 54 and rigidly connected to the rearward side of the backing plate 51 by bolts 60 and 61. Since the axes of the stub shafts 53 and 54 are in alignment and transverse to the axis of the output shaft 35 it is apparent that the stub shafts 53 and 54 support the backing plate 51 whereby the plate 51 is constrained for rotation with the output shaft 35 but may pivot or swivel about the common axis of the stub shafts 53 and 54.

The stub shafts 53 and 54 may be provided with bearing metal sleeves 61 and 62, respectively, such as bronze or Babbitt metal in a conventionally known manner.

In order to permit the backing plate 51 to swivel or pivot about the transverse common axis of stub shafts 53, 54 the plate 51 is provided with a hollow portion 63 (FIGURE 11) having its rearward end of elongated contour and tapering inwardly toward the forward side as indicated at 64 in FIGURE 8, the vertical sides being flat and in parallel spaced relation. The hollow portion 63 thus permits the swivel of the backing plate 51 through a limited angular displacement without interference of the output shaft 35 extending therethrough.

The forward side of the backing plate 51 is provided with an annular shaped surface 65 in contiguous relation with a forwardly extending cylindrical surface 66 as best shown in FIGURES 1B, 8 and 10. In journalled relation with the surfaces 65 and 66 of the backing plate 51, by conventional means such as roller bearings 67 and 68, is a motor swash plate thrust ring 69 as best seen in FIGURES 1B, 7, 8, 9 and 11. The backing plate 51 thus may rotate with the output shaft 35 in respect to the thrust ring 69.

The thrust ring 69 is provided with a pair of lobes 70, 71 in aligned position 180° apart as best shown in FIGURES 7 and 9. The lobe 70 is provided with a cylindrical recess 72 in press-fit relation with an outwardly extending stub shaft 73. Likewise the lobe 71 is provided a cylindrical recess 74 in press-fit relation with an outwardly extending stub shaft 75. From this it is apparent that the common axis of the stub shafts 73 and 75 is perpendicular to the longitudinal axis of the output shaft 35.

Journalled to the stub shafts 73 and 75 is an annular shaped yoke member 76, the journal relation being accomplished in a conventional manner such as bearing metal sleeves 77 and 78 positioned in the yoke 76 in press-fit relation. Thus the thrust ring 69 is in pivotal relation with respect to the yoke member 65.

Disposed on the rear section 26c of the stationary casing 26 in 180° relation is a pair of inwardly extending stationary stub shafts 79 and 80 as seen best in FIGURES 7 and 8. The stub shafts 79 and 80 may be press-fitted into suitable bores of the casing 26 as indicated in FIGURES 1B, 7 and 8. The yoke member 76 is provided with a second pair of bearing metal sleeves 81 and 82 aligned on a common axis 180° apart, the said axis being in 90° relation with the common axis for bearing sleeves 77 and 78 previously described. The sleeve 81 is press-fitted into the yoke 76 and is in journalled relation with the stationary stub shaft 79. Likewise sleeve 82 is press-fitted into the yoke 76 and is in journalled relation with the stationary stub shaft 80. Thus the yoke member 76 is pivotally connected to the rear section 26c of the stationary casing 26.

From the above it will be apparent that the casing 26 supports the yoke member 76 which in turn supports the thrust ring 69. Thus the thrust ring 69 is not supported by the backing plate 51 but is supported by the casing 26. Further it will be apparent that the thrust ring 69 cannot rotate with the backing plate 51 and its associated output shaft 35. It will also be observed that the relationship of the thrust ring 69, yoke member 76 and casing 26 is the same as that which exists in the commonly known universal or cardan joint; the casing 26 corresponding to the driven element, the thrust ring 69 corresponding to the driving element, and the connecting yoke corresponding to the yoke member 76. The advantage of this arrangement is (1) the thrust ring 69 is supported by the stationary casing 26, (2) the thrust ring 69 cannot rotate with the output shaft 35 and (3) a rearward force applied to the thrust ring 69 permits it to follow freely the annular surfaces 65 and 66 of the backing plate 51. The net result in this novel arrangement is that no circumferential force is applied to the motor cylinder connecting rods (e.g., 48b and 49b of FIGURE 1B) thereby eliminating an undesirable force component from the motor pistons and their respective bores. In previous known constructions a circumferential "drag" force is imposed on the connecting rods due to the friction of the relatively rotating swash plate. This drag force causes unnecessary high wear on one side of each piston and its cylinder bore. In the present arrangement virtually the entire force of the pistons and associated connecting rods is substantially in an axial direction with respect to the associated cylinder bores for the thrust ring 69 cannot rotate circumferentially but can freely follow the camming surface 65 of the relatively rotating backing plate 51.

Referring now to FIGURES 1 and 1A the pump swash plate 83 is constructed in exactly the same manner as that of the motor swash plate 50 above described except that its associated yoke member corresponding to yoke 76 is pivotally supported by the rotatable bell-shaped housing 34a instead of the stationary casing 26. Thus the pump swash plate thrust ring 84 is constrained for rotation with the pump cylinder block 34b while the pump backing plate 85 is constrained for rotation with the extension shaft 35c of the output shaft 35. Similar to that of the motor swash plate 50 the pump swash plate 83 may pivot or swivel about the extension shaft 35c as the construction details are the same.

Figure 6:
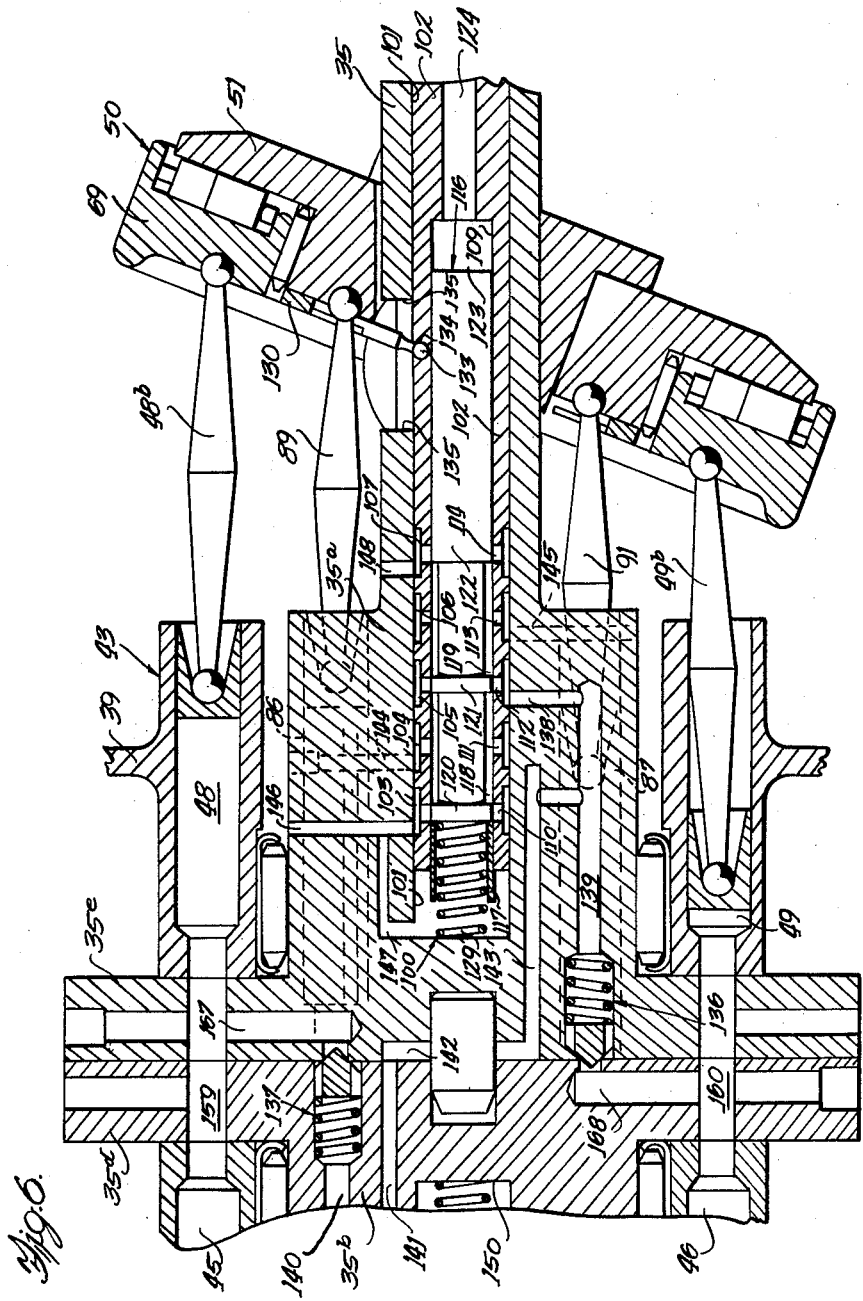
FIGURE 6 is a sectional view, partly broken away, of the motor cylinder block illustrating fluid passages and check valves therein represented diagrammatically but not necessarily in their true geometric position.

From the above it will be readily apparent that both swash plates 50 and 83 may swivel from the positions illustrated in FIGURE 1 through the vertical position shown in FIGURE 8 to positions opposite that illustrated in FIGURE 1, e.g., FIGURE 6.

The motor control body 35a with the pump control body 35b and flanges 35d and 35e are all constrained for rotation with the output shaft 35. The flange 35e is secured rigidly to the flange 35c by a plurality of bolts 38 as previously described and shown in FIGURES 13 and 14. The construction of the motor control body 35a and pump control body 35b will now be described.

Referring now to FIGURES 1 and 1B it will be seen that the motor control body 35a includes a pair of one-way acting hydraulic rams indicated at 86 and 87 disposed parallel to the axis of output shaft 35 in 180° relation with respect to each other. It will be noted that a plane coinciding with the longitudinal axes of rams 86 and 87 is perpendicular to the common axis of stub shafts 53 and 54 (FIGURE 9). The ram 86 is provided with a piston 88 and associated work member 89 as shown in FIGURE 1. Similarly the ram 87 is provided with a piston 90 and associated work member 91. The outer end of the work member 89 is provided with an integrally connected ball 92 seated in a generally spherical shaped recess 92' in the backing plate 51 of the swash plate 50. In order to prevent the inadvertent or accidental unseating of the ball 92 a slotted bracket 93 (FIGURES 1B and 7) is provided which bracket 93 is secured to the backing plate 51 by conventional means such as screw 94. Likewise the outer end of the work member 91 is provided with an integrally connected ball 95 seated in a recess 95' of the backing plate 51 and secured by slotted bracket 96 connected to the plate 51 by screw 97. This arrangement provides a pivotal connection between the work members 89 and 91 with the backing plate 51 of the swash plate 50.

From the above it will be readily apparent that by appropriate energizing of each ram 86, 87 the inclination of the swash plate 50 may be varied selectively.

The pump control body 35b is also provided with a pair of one-way acting hydraulic rams indicated at 98 and 99 disposed in the same plane as the rams 76 and 87 and in 180° relation with respect to each other. The rams 98 and 99 function to vary the angular displacement or inclination of the pump swash plate 83 in the same manner as that described for the rams 86 and 87 in respect of the motor swash plate 50 as previously described. Thus it may properly be assumed that the construction details of the rams 98 and 99 in relation to the backing plate 85 of the pump swash plate 83 are the same as that of the rams 86 and 87 in relation to the backing plate 51 of the motor swash plate 50 as described above. The control valve means for controlling the motor displacement control rams 86, 87 and the pump displacement control rams 98, 99 will now be described.

Referring to FIGURES 1, 1B and 6 the motor displacement control valve, indicated at 100, is disposed within the output shaft 35 and rotates therewith. In FIGURE 6 it will be seen that the output shaft 35 is provided with a large axial bore 101 terminating near the flange portion 35e and the other end extending to the end portion of the output shaft 35. Slidably disposed within the bore 101 is a valve element or sleeve 102 having six circumferential grooves 103, 104, 105, 106, 107 (FIGURE 6) and 108 (FIGURE 1B). The grooves 103–108 are communicatively connected to an axial bore 109 in the valve sleeve 102 through radial ports 110 to 115, respectively as shown.

Slidably disposed within the large bore 109 of the valve sleeve 102 is a valve plunger 116 having skirt 117, circumferential grooves 118 and 119, and lands 120, 121 and 122. A calibrated compression spring 129 is positioned partly within the skirt 117 for urging the valve plunger 116 in the rightward direction as viewed in FIGURE 6.

Within the bore 109 of the sleeve 102 adjacent the rightward end of plunger 116 is a valve chamber 123 communicatively connected to the circumferential groove 108 through fluid passage 124 and radial passage 125 as shown best in FIGURE 1B. The stationary casing 26c is provided with a fluid passage 126 which is always in communication with the radial passage 125 through a circumferential groove 127 and radial port 128 in the output shaft 35 and circumferential groove 108 in the valve sleeve 102. From this it will be apparent that fluid pressure introduced in the fluid passage 126 of the stationary casing 26c correspondingly pressurizes the valve chamber 123 for urging the plunger 116 leftwardly, as viewed in FIGURE 1B, against the compression spring 129. As will be seen later herein the axial position of the valve sleeve 102 is related to the angular displacement of the swash plate 50. Thus it is apparent that control of the fluid pressure in the passage 126 to a selected pressure serves to position selectively the axial position of the plunger 116 with respect to the motor control body 35a. The mechanical connection between the valve sleeve 102 and the backing plate 51 of the swash plate 50 will now be described.

Referring now to FIGURES 1B, 6, 7, 8 and 10 it will be seen (FIGURE 7) that a bracket 130 is secured rigidly to the backing plate 51 of swash plate 50 as by screws or bolts 131 and 132. The bracket 130 is provided with a portion having a ball 133 extending to and in seating relation with a spherical recess 134 formed in the outer periphery of the valve sleeve 102 as best shown in FIGURE 6. In order to accommodate the ball tipped projection of the bracket 130 an elongated slot 135 or opening is formed axially in the output shaft 35. From FIGURES 7 and 8 it will be seen that the plane formed by the bracket 130 passing through the center of the ball 133 is positioned forwardly or eccentrically with respect to the common axes of the stub shafts 53 and 54 about which stub shafts the backing plate 51 pivots with respect to the output shaft 35. Thus it will be apparent that as the inclination of the backing plate 51 is moved from the position illustrated in FIGURE 1B to that of FIGURE 8, the eccentricity of the ball 133 moves the valve sleeve 102 leftwardly, as viewed in FIGURE 6. Therefore the inclination of the backing plate 51 determines the axial position of the valve sleeve 102 with respect to the output shaft 35. As will be seen later the valve sleeve 102 serves as a follow up valve for telemetrically controlling the energizing of rams 86 and 87 to maintain the inclination of the backing plate 51 as set by the position of plunger 116. The fluid passages for controlling the rams 86 and 87 through the motor displacement control valve 100 will now be described.

Referring to FIGURE 19 fluid pressure, from a source later to be described, is delivered to radial ports 112 (FIGURE 6) from the outlet side of either check valve 136 or 137 depending upon the direction of rotation of the input shaft 34. In one direction the hydraulic fluid under pressure is supplied to the control valve 100 at port 138 from the outlet side of check valve 136 and passage 139 in control body 35a. In the other direction the hydraulic fluid under pressure is supplied to the control valve 100 at port 138 from the outlet side of check valve 137 through passages 140 and 141 in control body 35b, thence through annular groove 142 and passage 143 connecting with the previously described passage 139 to port 138 in the control body 35a. The means for pressurizing the inlet side of check valves 136 or 137 will become evident later. For the present it is suffice to say, from the above, that the port 138 in the control body 35a is always under pressure when the input shaft 34 is rotating.

From the position of the plunger 116 of the control valve 100 with respect to the sleeve 102 as shown in FIGURE 6 it will be seen that the pressure port 138 communicates with the circumferential groove 105 in the sleeve 102. The groove 105 communicates with radial ports 112 in the sleeve 102 but since the land 121 is in registry with radial ports 112 no fluid under pressure flows therethrough.

The circumferential groove 118 in the plunger 116 is always in communication with the circumferential groove 104 and radial ports 111 in the sleeve 102 as seen in FIGURE 6. The circumferential groove 104 in turn is always in communication with fluid passage 144 shown in dotted lines in FIGURE 6, partly in dotted and full lines in FIGURE 14 and in full lines in FIGURE 16 which passage leads to the motor control ram 86. In a similar manner circumferential groove 119 in the plunger 116 is always in communication with circumferential groove 106 in the sleeve 102 through radial ports 113 (FIGURE 6). The groove 106 is in turn always in communication with the motor control displacement ram 87 through fluid passage 145 as shown in dotted lines in FIGURE 6, partly in dotted lines and partly in full lines in FIGURE 14 and in full lines in FIGURE 16.

Circumferential groove 103 in the sleeve 102 is always in communication with sump 27 through fluid passage 146 which opens to the outer surface of the motor control body 35a as best seen in FIGURES 6 and 19. A vent passage 147 for venting the chamber containing the spring 129 communicates with the sump 27 in the same manner as evident from FIGURES 6 and 18. In the position shown in FIGURE 6 no fluid flow occurs in the groove 103 because the connecting radial ports 110 are in registry with land 120 of the plunger 116.

Circumferential groove 107 in the sleeve 102 like groove 103 is always in communication with sump 27 by way of fluid passage 148 shown in FIGURES 6, 12 and 19.

Referring again to FIGURES 1B and 6 in the position illustrated it will be apparent that the motor control rams 86 and 87 are hydraulically locked for the circumferential groove 118 in the plunger 116 is not in communication with any other port except radial port 111 and the groove 119 is only in communication with radial port 113. Hence the rams 86 and 87 are neither being pressurized nor permitted to exhaust and therefore hydraulically locked. Now if the externally controlled fluid pressure in passage 126 is increased the plunger 116 moves leftwardly as viewed in FIGURE 6 to a new position thus further compressing the spring 129. Immediately the land 121 uncovers the radial port 112 thereby communicating the fluid pressure passage 138 with circumferential groove 119 in the plunger 116, pressurizing the groove 119 thus energizing expansively the motor displacement control ram 87. At the same time land 120 uncovers radial port 110 thus communicating circumferential groove 118 in the plunger 116 with drain passage 146. Since the groove 118 is always in communication with the motor displacement control ram 86, the ram 86 is thus permitted to retract by exhausting its fluid to drain. Energizing of the ram 87 expansively therefore rotates the swash plate 50 in a counterclockwise direction as viewed in FIGURE 6.

Now as the swash plate 50 shifts in angular displacement or inclination in a counterclockwise direction from that shown in FIGURE 6, the ball 133 of the bracket 130 moves the sleeve 102 leftwardly until it coincides with the same relative position with respect to the plunger 116 as shown in FIGURE 6 while at that time lands 120, 121 and 122 respectively register with radial ports 110, 112 and 114. Thereafter the ram 87 is no longer energized and ram 86 is no longer permitted to exhaust, thus both rams being again hydraulically locked.

From the above it will be noted that in the event fluid leakage occurs in the lines leading to the rams 86 and 87 may permit creeping movement of pistons 88 and 90 resulting in a gradual change of inclination of the swash plate 50. However, in the arrangement shown if creeping movement of pistons 88 and 90 did occur the change in the swash plate 50 inclination also shifts sleeve 102 in a corresponding direction which again actuates the rams 86 and 87 in the manner described thus automatically correcting itself. Thus for a given position of the plunger 116 with respect to the control body 35a, the angular inclination of the swash plate 50 will automatically assume a corresponding fixed value. Therefore the inclination of the swash plate 50 is a direct function of the fluid pressure maintained at the fluid passage 126. The calibrated control of the fluid pressure in passage 126 may be accomplished by any of several conventionally known means and will not be discussed in detail here although one means is shown schematically in FIGURE 20.

The pump displacement control valve, indicated generally at 150 in FIGURE 1A, is constructed in the same manner as that of the motor displacement control valve 100 described above and is positioned in the pump control body 35b. The externally controlled fluid pressure for actuating plunger 151 is introduced through passage 152 in the front section 26a of the stationary casing 26 as best shown in dotted lines in FIGURE 3 and in full lines in FIGURE 5. The passage 152 communicates with an annular groove 153 shown in FIGURE 1A. The input shaft 34 is provided with radial port 154 in communication with the annular groove 153. The radial port 154 is communicatively connected to an axial passage 155 in the input shaft 34. The sleeve valve member 155 (corresponding to sleeve 102 in the motor control valve 100) is provided with an axial passage 157 which connects with passage 155 through a tubular element 158 recessed in both the input shaft 34 and valve sleeve member 155 as seen best in FIGURE 1A. The tubular element 158 rotates with the input shaft 34 and is journalled for rotative and axially slidable movement with respect to the valve sleeve member 155. Thus as in the case of controlling the motor swash plate 50 previously described, the angular displacement or inclination of the pump swash plate 83 may be controlled by regulating selectively the fluid pressure maintained in the passage 152 of the front section 26a in stationary casing 26. It will be observed that the above described arrangement of control valves 100 and 150 coincides with the common axis of rotation for both the input shaft 34 and output shaft 35. Thus the valves 100 and 150 are not affected during operation by centrifugal forces. This has a distinct advantage in that it is unnecessary to provide means for compensating for the effects of centrifugal forces which otherwise would be necessary.

The valving means for communicating fluid flow between the pump cylinders (e.g., 45 and 46) of the pump 42 and the motor cylinders (e.g., 48 and 49) of the motor 43 in an operative relation is through openings or passages 159 and 160 positioned in the flanges 35d and 35e as shown in FIGURE 1. These passages 159 and 160 are sometimes referred to as "kidney valves" presumably from their substantially semi-circular shape and are shown best in FIGURES 13 and 14. As is conventional one of the kidney valves will be at high pressure and the other at low pressure depending upon in most circumstances the direction of rotation of the input shaft 34 and the direction of power flow through the transmission 25. Now in order that the transmission 25 may function as a hydraulic brake with respect to the output shaft 35, and also as a fluid pressure power take-off, externally controlled means are provided for communicatively connecting together the kidney valves or passages 159 and 160 in by-pass relation which will now be described.

Referring to FIGURES 1, 1A, 1B, 2, 13 and 14 it will be seen that the stationary casing 26, in the central portion thereof, includes an annular section or manifold 26b in slidable relation with the peripheral surfaces of the flanges 35d and 35e. Within the manifold 26b are two annular chambers 161 and 162 of generally toroidal shape. Chamber 161 communicates with the manifold port 30 and chamber 162 communicates with manifold port 31 as best seen in FIGURES 1A and 1B. The chamber 161 is also provided with an annular valve port 163 or opening in registry with the outer peripheral surface of the pump flange 35d. Likewise the chamber 162 is also provided with an annular valve port 164 or opening in registry with the outer peripheral surface of the motor flange 35e.

Referring now to FIGURES 2 and 14 it will be seen that the motor flange 35e is provided with a plurality of radial passages 165 in communication with kidney valve opening 160 which passages register with the annular valve port 164 of the manifold 26b. Thus the kidney valve opening 160 is in continuous communication with chamber 162 of the manifold 26b. It will be noted from FIGURES 2 and 14 that the radial passages 165 are disposed in one semi-circular portion of the motor flange 35e. Similarly the chamber 161 of the manifold 26b is in continuous communication with the kidney valve opening 159 through radial passages 166 as best seen in FIGURES 1A and 13. From the foregoing it will thus be apparent that the manifold port 30 is in continuous communication with kidney valve opening 159 and manifold port 31 is in continuous communication with kidney valve opening 160. Now since one of the kidney valve openings is at high pressure and the other at low pressure depending generally upon the direction of rotation of the input shaft 34 it will be apparent that a fluid pressure differential exists between the manifold port 30 and manifold port 31. This fluid pressure differential is utilized as a fluid power take-off from the transmission 25 for energizing fluid powered accessories such as hydraulic rams for operating a bulldozer (not shown). In this respect the available power take-off fluid pressure depends upon resistance to rotation (i.e., load) of the output shaft 35. If desired the output shaft 35 can be locked against rotation by an auxiliary brake (not shown) in which case the power input to shaft 34 may be entirely utilized as fluid power take-off between manifold ports 30 and 31, one being at high pressure and the other at low pressure (return flow). For hydraulically braking the output shaft 35 the fluid flow between the manifold ports 30 and 31 is controlled restrictively or throttlingly through a bleed valve 190 (FIGURE 20) accompanied by positioning properly the inclination of the rotatable swash plates 50 and 83 which fluid flow control imposes a selectively variable resistance to rotation of the output shaft 35 independent of the input shaft. For example, if the pump swash plate 83 is at vertical position and the motor swash plate 83 is inclined, the input shaft 34 can rotate freely, but if the output shaft 35 is then driven the motor unit 43 will act as a pump thus creating a differential pressure between the kidney valves 159 and 160 and the flow therebetween can be regulated by a variable bleed valve 190 (FIGURE 20) of conventional construction.

In order to provide fluid pressure for operating the motor displacement control rams 86 and 87 as well as the pump displacement control rams 98 and 99, which were previously explained, the inlet side of check valve 137 (FIGURE 6) in the pump flange 35d communicates with kidney valve opening 159 through radial passage 167 also shown in dotted lines in FIGURE 14. Likewise the inlet side of check valve 136 (FIGURE 6) in the motor flange 35e communicates with the kidney valve opening 160 through radial passage 168 also shown in dotted lines in FIGURE 13. Thus during operation one of the check valves 136 or 137, depending upon the direction of rotation of the input shaft 34, will open due to high pressure which in turn pressurizes passage 138 leading to the motor displacement control valve 100 (FIGURE 19) and passage 140 leading to the pump displacement control valve 150.

At this point it may be appreciated that if the output shaft 35 is idle and the pump swash plate 83 is in a vertical position, as viewed in FIGURE 1, there will be no displacement of the pump cylinders 45 and 46. Thus no fluid pressure would be created if the input shaft 34 is rotated. In such condition there would be no pressure in the system for initially energizing the displacement control rams 86, 87, 98 and 99. Therefore in order to move initially the pump swash plate 83 from its vertical position, as viewed in FIGURE 1, fluid pressure must be introduced into the working system from a secondary source. Such secondary source of fluid pressure must be sufficiently great to energize one of the control rams 98 or 99 for shifting the angular displacement of the pump swash plate 83 slightly from the perpendicular so that the displacement of pump cylinders 45 and 46 is greater than zero. As soon as the pump cylinders 45 and 46 begin to reciprocate the transmission 25 will generate its own operating fluid pressure. In order to accomplish initial inclination from the vertical of the pump swash plate 83 a secondary source of fluid pressure is provided in the form of a charge pump 169 driven by the input shaft 34 mounted on the leftward or forward end portion of the transmission 25 as viewed best in FIGURE 1. The charge pump 169 is of conventional construction and may for convenience be of the variable displacement type. The charge pump 169 draws fluid from the sump 27 through inlet conduit 170 and discharges through conduit 171. A fluid filter and strainer, indicated in FIGURES 1A and 20, may be provided to ensure the removal of solid particles thus preventing damage or malfunction.

Figure 4:
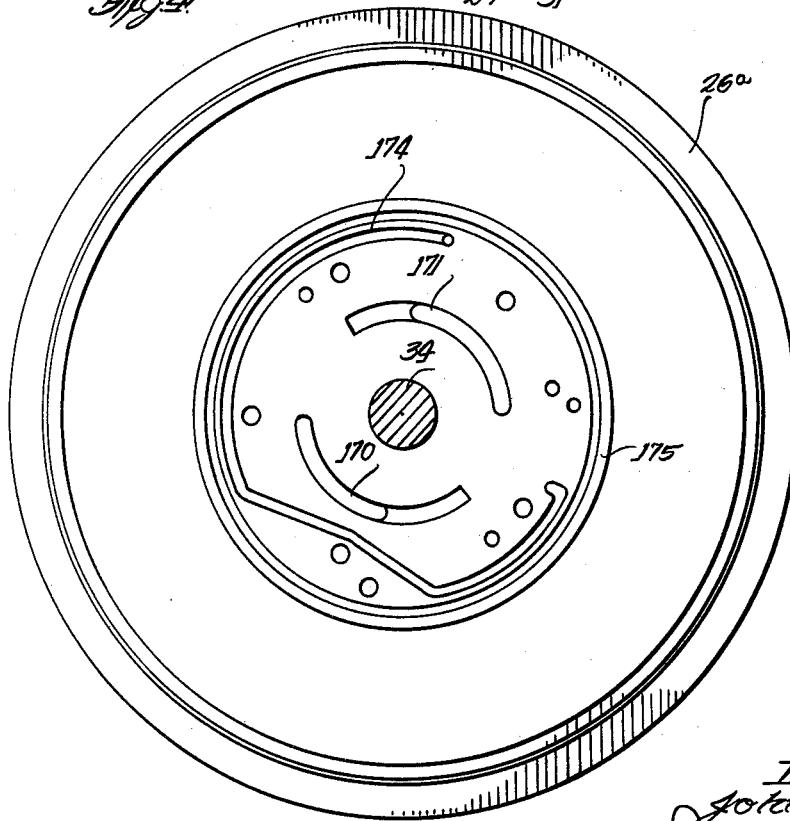
FIGURE 4 is an end view taken on line 4—4 of FIGURE 1 showing fluid passages in the stationary casing associated with the auxiliary pump.

The charge pump 169 is provided with a rotor 172 (FIGURE 1) constrained for rotation with the input shaft 34. An inlet port 170 (FIGURE 4) and outlet port 171 as well as a fluid leakage drain passage 173 leading back to the sump 27 are also provided. In the embodiment shown the displacement capacity of the conventional charge pump 169 is varied selectively by external control of the fluid pressure in the passage 174 shown in FIGURE 4. Conventional O-ring seals 175 (FIGURE 4) are provided to minimize fluid leakage of the charge pump 169.

In order to permit rotation of the input shaft 34 in either direction provision is made for reverse flow of the charge pump 169 whereby the inlet and outlet passages 170 and 171 are interchangeable. Referring to FIGURE 20 it will be seen that the passage 171 of charge pump 169 communicates with the inlet side of check valve 176 and to the outlet side of check valve 177. Similarly the passage 170 of charge pump 169 communicates with the inlet side of check valve 178 and to the outlet side of check valve 179. Also the outlet sides of check valves 176 and 178 are communicatively connected to conduit 180 leading to the inlet side of check valve 181 and the inlet sides of check valves 177 and 179 are communicatively connected to the sump 27 through conduits 181 and 182 respectively as shown. From this it can be seen that when the rotor 172 of charge pump 169 is rotated in one direction fluid is drawn from the sump 27 through the strainer and filter, and check valve 179 into the pump. The discharge of the pump 167 is through conduit 171, check valve 176 to conduit 180. When the rotor 172 is rotated in the other direction fluid is drawn from the sump 27 through the strainer and filter, through conduit 182 and through check valve 177, conduit 171 into the pump 169. The discharge of the pump 169 is then through conduit 170, through check valve 178 into conduit 180 as shown. Thus the pump 169 can be operated in either direction but its discharge pressure is always delivered to the conduit 180.

Now if the manifold port 30, which leads to kidney valve 159, is at low pressure by reason of the direction of rotation of the input shaft 34 or the pump swash plate 83 is in perpendicular position (output shaft 35 idle) fluid under pressure from the charge pump 169 passes from conduit 180 through check valve 181 into the manifold port 30 to kidney valve 159. Since kidney valve 159 is under the charge pump pressure, this pressure is available for energizing displacement control rams 86, 87, 98 and 99 as previously explained and shown schematically in FIGURE 20. On the other hand if high pressure exists at the manifold port 30 then the check valve 181 is closed. Thus it will be understood that the *minimum* fluid pressure in the manifold port 30 and kidney valve 159 will be the fluid pressure from the charge pump 169 to the conduit 180. It will now be explained that the manifold port 31 and its kidney valve 160 are also under the minimum pressure delivered to the conduit 180 by the charge pump 169.

From FIGURE 20 it will be seen that the discharge pressure conduit 180 from the charge pump 169 communicates with the inlet side of check valve 183 through branch conduits 184 and 185 as shown. The outlet side of check valve 183 is connected to the manifold port 31. Thus if the manifold port 31 and its associated kidney valve 160 are at low pressure then fluid under pressure from the charge pump 169 passes through check valve 183 and thus the minimum pressure in kidney valve 160 is that pressure delivered to the charge pump 169. If manifold port 31 is at high pressure then the check valve 183 is closed. Thus during operation of the transmission 25 the minimum pressure existing in the kidney valves 159 and 160 is substantially equal to the fluid pressure delivered by the charge pump 169. This arrangement not only provides fluid pressure for initially energizing the displacement control rams 86, 87, 98 and 99 when the pump swash plate 83 is initially at the vertical position as viewed in FIGURE 1 but also provides replenishment fluid to compensate for any leakage losses sustained in the working circuit. It will also be observed from FIGURE 20 that the discharge pressure from the charge pump 169 is employed to actuate the displacement control valves 100 and 150.

Charge pump fluid pressure from conduit 180 communicates with passage 152 through branch conduits 184 and 186 thence through a manually adjustable pressure regulating valve 187 to the displacement control valve 150. Likewise the displacement control valve 100 is actuated from fluid pressure in conduit 180 through branch conduit 184 and adjustable pressure regulating valve 188. Thus it will be apparent that when the input shaft 34 is rotated in either direction positive fluid pressure is available for initially actuating the displacement control valves 100 and 150 and their associated displacement control rams 86, 87, 98 and 99. It will also be apparent that when the output shaft 35 is in driven relation with the input shaft 34 the fluid pressure for energizing the displacement control rams 86, 87, 98 and 99 is derived from the fluid pressure working circuit between the transmission pump 42 (i.e., cylinders 45 and 46) and motor 43 (i.e., cylinders 48 and 49).

It will be appreciated that when the rotatable swash plates 50 and 83 are in perpendicular position, with reference to the plane of FIGURE 1, the transmission is in neutral condition whereby the input shaft 34 and output shaft 35 may rotate freely with respect to each other. However, due to manufacturing tolerances and other salient reasons it is difficult to achieve an *exact* perpendicular position for each of the swash plates 50 and 83 to avoid creeping. Therefore, as seen in FIGURE 20 a by-pass conduit 189 is provided with an interposed conventional bleed valve 190 externally controlled for communicating manifold port 30 with manifold port 31. Thus when the bleed valve 190 is open the transmission 25 will be in neutral condition irrespective of inclination of the swash plates 50 and 83 because, in effect, the kidney valves 159 and 160 are short circuited thereby permitting no fluid pressure differential to exist therebetween. From this it is apparent that an operator in an emergency may place the transmission 25 in neutral condition by merely opening the bleed valve 190.

As mentioned previously the bleed valve 190 may also be employed to brake controllably the output shaft 35 with the input shaft 34 idling. To accomplish this the operator first shifts the pump swash plate 83 to perpendicular position thus permitting the input shaft 34 to idle. The motor swash plate 50 is shifted to an inclined position. In such condition if the output shaft 35 is driven (e.g., vehicle coasting downhill) the transmission motor unit 43 (i.e., cylinders 48 and 49) acts as a fluid pump. Now the operator may control the magnitude of braking effect on the output shaft 35 by selective operation of the bleed valve 190 which controls the rate of fluid flow therethrough. Of course if the amount of energy applied to drive the output shaft 35 during braking operation is large and sustained, such as a large loaded truck moving down hill on a mountain road, such energy of braking is converted to heat which must be dissipated. This heat dissipation may be accomplished by interposing a suitable heat exchanger (not shown) in the conduit 189.

As mentioned previously the transmission 25 is adapted to provide a fluid pressure power take-off for operating various hydraulic accessories including control valves therefor, indicated at 191 in FIGURE 20, such as a bulldozer shovel and the like. It will be recalled that when the transmission 25 is in operation a fluid presure differential exists between the externally accessible manifold ports 30 and 31. This pressure differential may be employed to operate accessories 191. However it is pointed out that the fluid power available for operation of accessories 191 is dependent upon the resistance to rotation (load) applied to the output shaft 35. If such resistance is small due to light load then an external brake (not shown) must be applied to the output shaft 35. Where the output shaft 35 is completely blocked against rotation as by external brake, the entire output of the transmission pump 42 (cylinders 45 and 46) may be utilized for fluid pressure available to the accessories 191. It will be recalled that even though the motor swash plate 50 is in perpendicular position (i.e., zero displacement of motor cylinders 48 and 49) the high pressure in the pump cylinders (e.g., 45 or 46) exerts a reactive force on the pump swash plate 83 thus transmitting torque to the output shaft 35.

In order to provide positive fluid pressure to the accessories 191 irrespective of the direction of rotation of the input shaft 34 it is necessary to provide a system of check valves similar in arrangement to the check valves 176, 177, 178 and 179 previously described. In FIGURE 20 it will be seen that the manifold port 30 communicates with the outlet side of check valve 192 and the inlet side of check valve 193. Likewise the manifold port 31 communicates with the outlet port of check valve 194 and the inlet side of check valve 195. The inlet sides of check valves 192 and 194 communicate with the discharge side of accessories 191 through conduit 196 as shown. The outlet sides of check valves 193 and 195 communicate with the intake side of accessories 191 through conduits 197 as shown. Now when high fluid pressure exists at manifold port 30 the fluid pressure to accessories 191 is through check valve 193 and conduit 197, the check valve 195 being closed. The discharge fluid from accessories 191 is directed to the manifold port 31 (at low pressure) through conduit 196 and check valve 194, the check valve 192 being closed. In the alternative, as when the input shaft 34 direction of rotation is reversed, the manifold port 31 will be at high pressure. Fluid under high pressure from manifold port 31 is available to accessories 191 through conduit 197 and check valve 195, the check valve 193 being closed. The exhaust fluid from the accessories 191 returns to manifold port 30 (at low pressure) through conduit 196 and check valve 192, the check valve 194 being closed. Thus during operation fluid pressure from the working circuit of transmission 25 is available in conduit 197 for operation of the accessories irrespective of the direction of rotation of the input shaft 34.

From the above it will be appreciated that where the direction of rotation of the input shaft 34 is limited to one direction, such as when it is driven by an internal combustion engine employed for propelling vehicles, the check valves 176, 177, 178 and 179 may be eliminated. In such case the outlet 171 for charge pump 169 is connected to the conduit 180 and its inlet 170 is connected to the sump 27. Check valves 192, 193, 194 and 195 may not be so eliminated unless the hydraulic braking feature of the output shaft 35 is not to be utilized.

In connection with the normal operation of the transmission 25 it can be seen that by controlling the fluid pressure in conduits 152 and 126 through independent manual control of the regulator valves 187 and 188, respectively, the angular displacement of the swash plates 83 and 50 may be positioned selectively and independent of each other. This arrangement makes it possible to vary infinitely the speed ratio of the output shaft 35 with respect to the input shaft 34 within the range of forward overdrive, through direct drive, neutral and reverse overdrive. Also means have been shown and described for controllably braking the output shaft 35 by operation of the manually operable bleed valve 190 with proper positioning of the rotatable swash plates 50 and 83. Further, the transmission 25 may be instantly placed in neutral condition by operation of the bleed valve 190 to open position. Lastly, hydraulic powered accessories 191 may be energized directly from the working circuit of the transmission 25 and that the input shaft 34 may be driven in either direction.

Having thus described a preferred embodiment of the invention it can now be seen that the objects of the invention have been fully achieved and it must be understood that changes and modifications may be made which do not depart from the spirit of the invention nor from the scope thereof as defined in the appended claims.

What is claimed is:

1. For an infinitely variable speed ratio hydromechanical transmission device having an input shaft and an output shaft, a multi-cylinder variable displacement hydraulic pump unit with a variable angularly displaceable first swash plate having a first backing plate constrained for rotation with said output shaft, a multi-cylinder variable displacement hydraulic motor unit with a variable angularly displaceable second swash plate having a second backing plate constrained for rotation with said output shaft, said pump and motor being hydraulically interconnected operatively for hydromechanically transmitting power from said input shaft to said output shaft, a control means for selectively varying the angular displacement of each of said swash plates independently comprising: a pump control body and a motor control body constrained for rotation with said output shaft, a pair of pump displacement control rams disposed in said pump body operatively connected for tilting said pump swash plate, a pair of motor displacement control rams disposed in said motor control body operatively connected for tilting said motor swash plate, a fluid pressure operated pump displacement control valve and a fluid pressure operated motor displacement control valve disposed in said output shaft in axial alignment with one another, said pump control valve having an axially slidable first valve sleeve element constrained to a position corresponding to the angular displacement of said first backing plate, said motor control valve having an axially slidable second valve sleeve element constrained to a position corresponding to the angular displacement of said second backing plate, an avially slidable fluid pressure operated first valve plunger disposed in said first valve sleeve element and an axially slidable fluid pressure operated second valve plunger disposed in said second valve sleeve element, fluid conduit means disposed in said pump control body operatively connecting said pump displacement control rams with said pump control valve and fluid conduit means disposed in said motor control body operatively connecting said motor displacement control rams with said motor control valve, a primary source of high fluid pressure emanating from said multi-cylinder pump communicatively connected to said pump displacement control valve and motor displacement control valve for energizing said pump displacement control rams and said motor displacement control rams, a first source of externally adjustable fluid pressure communicatively connected to said pump displacement control valve for axially positioning said first plunger corresponding to a selected first fluid pressure whereby one of said pump displacement control rams is energized to tilt said first backing plate until said first valve sleeve element is moved to correspond with a selected position of said first plunger, a second source of externally adjustable fluid pressure connected to said motor displacement control valve for axially positioning said second plunger corresponding to a selected second fluid pressure whereby one of said motor displacement control rams is energized to tilt said second backing plate until said second valve sleeve element is moved to correspond with a selected position of said second plunger, and a secondary source of fluid pressure connected to said primary source to energize said displacement control rams when said multi-cylinder hydraulic pump is at zero displacement.

2. For an infinitely variable speed ratio hydromechanical transmission device having an input shaft and an output shaft, a multi-cylinder variable displacement hydraulic pump unit with a variable angularly displaceable first swash plate having a first backing plate constrained for rotation with said output shaft, a multi-cylinder variable displacement hydraulic motor unit with a variable angularly displaceable second swash plate having a second backing plate constrained for rotation with said output shaft, said pump and motor being hydraulically interconnected operatively for hydromechanically transmitting power from said input shaft to said output shaft, a control means for selectively varying the angular displacement of each of said swash plates independently comprising: a pump control body and a motor control body rotatable with said output shaft, at least one pump displacement control ram disposed in said pump control body operatively connected for tilting said pump swash plate, at least one motor displacement control ram disposed in said motor control body operatively connected for tilting said motor swash plate, a fluid pressure operated pump displacement control valve and a fluid pressure operated motor displacement control valve disposed in said output shaft in axial alignment, with one another, said pump control valve having an axially slidable first valve sleeve element constrained to a position corresponding to the angular displacement of said first backing plate, said motor control valve having an axially slidable second valve sleeve element constrained to a position corresponding to the angular displacement of said second backing plate, an axially slidable fluid pressure operated first valve plunger disposed in said first valve sleeve element and an axially slidable fluid pressure operated second valve plunger disposed in said second valve sleeve element, fluid conduit means disposed in said pump control body operatively connecting said pump displacement control ram with said pump control valve and fluid conduit means disposed in said motor control body operatively connecting said motor displacement control ram with said motor control valve, a primary source of high fluid pressure emanating from said pump communicatively connected to said pump and motor displacement control valves for energizing said rams, a first source of externally adjustable fluid pressure communicatively connected to said pump displacement control valve for axially positioning said first plunger corresponding to a selected first fluid pressure whereby said pump displacement control ram is energized to tilt said first backing plate until said first valve sleeve element is moved to correspond with a selected position of said first valve plunger, a second source of externally adjustable fluid pressure connected to said motor displacement control valve for axially positioning said second plunger corresponding to a selected second fluid pressure whereby said motor displacement control ram is energized to tilt said second backing plate until said second valve sleeve element is moved to correspond with a selected position of said second plunger, and a secondary source of fluid pressure connected to said primary source to energize said displacement control rams when said hydraulic pump is at zero displacement.

3. For an infinitely variable speed ratio hydromechanical transmission device having an input shaft and an output shaft, a multi-cylinder variable displacement hydraulic pump unit with a variable angularly displaceable first swash plate having a first backing plate constrained for rotation with said output shaft, a multi-cylinder variable displacement hydraulic motor unit with a variable angularly displaceable second swash plate having a second backing plate constrained for rotation with said output shaft, said pump and motor units being hydraulically interconnected operatively for hydromechanically transmitting power from said input shaft to said output shaft, a control means for selectively varying the angular displacement of each of said swash plates comprising: a pump control body and a motor control body rotatable with said output shaft, at least one pump displacement control ram disposed in said pump control body operatively connected for tilting said first backing plate, at least one motor displacement control ram disposed in said motor control body operatively connected for tilting said second backing plate, a fluid pressure operated pump displacement control valve and a fluid pressure operated motor displacement control valve disposed in said output shaft, said pump control valve having an axially slidable fluid pressure operated first valve plunger, said motor control valve having an axially slidable fluid pressure operated second valve plunger, fluid conduit means disposed in said pump control body operatively connecting said pump displacement control ram with said pump control valve and fluid conduit means disposed in said motor control body operatively connecting said motor displacement control ram with said motor control valve, a primary source of high fluid pressure emanating from said pump communicatively connected to said pump and motor displacement control valves for energizing said rams, a first source of externally adjustable fluid pressure communicatively connected to said pump displacement control valve for axially positioning said first plunger corresponding to a selected first source fluid pressure, said pump control valve having a first telemetric means for energizing said pump control ram until the angular displacement of said first backing plate corresponds with the position of said first plunger whereby the angular displacement of said pump swash plate is a direct function of the pressure of said first source, a second source of externally adjustable fluid pressure communicatively connected to said motor displacement control valve for axially positioning said second plunger corresponding to a selected second source fluid pressure, said motor control valve having a second telemetric means for energizing said motor control ram until the angular displacement of said second backing plate corresponds with the position of said second plunger whereby the angular displacement of said motor swash plate is a direct function of the pressure of said second source, and an auxiliary source of fluid pressure connected to said primary source to energize said displacement control rams when said hydraulic pump is at zero displacement.

4. For an infinitely variable speed ratio hydromechanical transmission device having an input shaft and an output shaft, a multi-cylinder variable displacement hydraulic pump unit with a variable angularly displaceable first swash plate having a first backing plate constrained for rotation with said output shaft, a multi-cylinder variable displacement hydraulic motor unit with a variable angularly displaceable second swash plate having a second backing plate constrained for rotation with said output shaft, said pump and motor units being hydraulically interconnected operatively for transmitting power from said input shaft to said output shaft, a control means for selectively varying the angular displacement of each of said swash plates comprising: a pump control body and a motor control body rotatable with said output shaft, a pump displacement control ram disposed in said pump control body operatively connected for tilting said first backing plate, a motor displacement control ram disposed in said motor control body operatively connected for tilting said second backing plate, a fluid pressure operated pump displacement control valve, said pump control valve having a fluid pressure operated movable first valve element, said motor control valve having a fluid pressure operated movable second valve element, fluid conduit means in said pump control body operatively connecting said pump displacement control ram with said pump control valve and fluid conduit means disposed in said motor control body operatively connecting said motor displacement control ram with said motor control valve, a primary source of high fluid pressure emanating from said pump communicatively connected to said pump and motor control valves for energizing said rams, a first source of externally adjustable fluid pressure communicatively connected to said pump control valve for positioning said first valve element corresponding to a selected first source fluid pressure, said pump control valve having a first telemetric means for energizing said pump control ram until the angular displacement of said first backing plate corresponds with the position of said first valve element whereby the angular displacement of said pump swash plate is a direct function of the pressure of said first source, a second source of externally adjustable fluid pressure communicatively connected to said motor displacement control valve for positioning said second valve element corresponding to a selected second source fluid pressure, said motor control valve having a second telemetric means for energizing said motor control ram until the angular displacement of said second backing plate corresponds with the position of said second valve element whereby the angular displacement of said motor swash plate is a direct function of the pressure of said second source, and an auxiliary source of fluid pressure connected to said primary source to energize said rams when said hydraulic pump is at zero displacement.

5. For an infinitely variable speed ratio hydromechanical transmission device having an input shaft and an output shaft, a multi-cylinder variable displacement hydraulic pump unit with a variable angularly displaceable first swash plate having a first backing plate rotatable with said output shaft, a variable displacement hydraulic motor unit with a variable angularly displaceable second swash plate having a second backing plate rotatable with said output shaft, said pump and motor units being hydraulically interconnected operatively for transmitting power from said input shaft to said output shaft, a control means for selectively varying the angular displacement of each of said swash plates comprising: a pump control body and a motor control body rotatable with said output shaft, a pump displacement control ram in said pump control body operatively connected for tilting said first backing plate, a motor displacement control ram in said motor control body operatively connected for tilting said second backing plate, a pump displacement control valve having an externally operable first valve element, and a motor displacement control valve having an externally operable second valve element, first fluid conduit means communicatively connecting said pump displacement control ram with said pump displacement control valve and second fluid conduit means communicatively connecting said motor displacement control ram with said motor displacement control ram, a primary source of high fluid pressure emanating from said pump connected to said pump and motor control valves for energizing said rams, a first telemetric means connected to and forming a part of said pump control valve and operatively connected to said pump swash plate for energizing said pump control ram until the angular displacement of said first backing plate corresponds with a selected position of said first valve element, a second telemetric means connected to and forming a part of said motor control valve and operatively connected to said motor swash plate for energizing said motor control ram until the angular displacement of said second backing plate corresponds with a selected position of said second valve element, and an auxiliary source of fluid pressure connected to said primary source to energize said rams when said hydraulic pump is at zero displacement.

6. For an infinitely variable speed ratio hydromechanical transmission having an input shaft, an output shaft, a multi-cylinder variable displacement hydraulic pump unit with a tiltable first swash plate having a first backing plate rotatable with said output shaft, a variable displacement hydraulic motor unit with a tiltable second swash plate having a second backing plate rotatable with said output shaft, said units being hydraulically interconnected operatively for transmitting power hydromechanically from said input shaft to said output shaft, a control means for selectively varying the angle of tilt of each of said swash plates comprising: a pump control body and a motor control body rotatable with said output shaft, a pump displacement control ram in said pump control body operatively connected for tilting said first backing plate, a motor displacement control ram in said motor control body operatively connected for tilting said second backing plate, a pump displacement control valve having an externally operable first valve element communicatively connected with said pump control ram, and a motor displacement control valve having an externally operable second valve element communicatively connected to said motor control ram, a source of fluid pressure connected to said control valves for energizing said rams, a first telemetric means connected to and forming a part of said pump control valve and operatively connected to said pump swash plate for energizing said pump control ram until the tilt angle of said first backing plate corresponds with a selected position of said first valve element, a second telemetric means connected to and forming a part of said motor control valve and operatively connected to said motor swash plate for energizing said motor control ram until the tilt angle of said second backing plate corresponds with a selected position of said second valve element.

7. For an infinitely variable speed ratio hydromechanical transmission having an input shaft, and output shaft, a multi-cylinder variable displacement hydraulic pump unit with a tiltable first swash plate having a first backing plate rotatable with said output shaft, a variable displacement multi-cylinder hydraulic motor unit with a tiltable second swash plate having a backing plate rotatable with said output shaft, said units being hydraulically interconnected operatively for transmitting power hydromechanically from said input shaft to said output shaft, control valve means for selectively varying the angle of tilt of each of said swash plates comprising: a pump control body and a motor control body rotatable with said output shaft, a pump displacement control ram in said pump control body operatively connected for tilting said first backing plate, a motor displacement control ram in said motor control body operatively connected for tilting said second backing plate, a pump displacement control valve having an externally operable first valve element communicatively connected with said pump control ram and a motor displacement control valve having an externally operable second valve element communicatively connected to said motor control ram, and a source of fluid pressure connected to said control valves for energizing said rams whereby the tilt angle of said first swash plate corresponds to the selected position of said first valve element and the tilt angle of said second swash plate corresponds to the selected position of said second valve element thereby controlling the fluid displacement of each of said units and the speed ratio of said output shaft with respect to said input shaft.

8. For an infinitely variable speed ratio hydromechanical transmission having an input shaft, an output shaft, a multi-cylinder hydraulic pump unit driven by said input shaft and a multi-cylinder hydraulic motor unit in drive relation with said output shaft, at least one of said units being of variable displacement with a tiltable swash plate axially rotatable with one of said shafts, said units being hydraulically interconnected operatively for transmitting power hydromechanically from said input shaft to said output shaft, a control means for selectively varying the tilt angle of said swash plate comprising: a control body axially rotatable with said swash plate, a displacement control ram disposed in said body operatively connected for tilting said swash plate, a displacement control valve having an externally operable fluid pressure actuated valve element communicatively connected to said ram, a source of fluid pressure connected to said control valve for energizing said ram, a telemetric means operatively connected to said control valve and operatively connected to said swash plate for energizing said ram from said source until the tilt angle of said swash plate corresponds with a selected position of said valve element whereby the tilt angle of said swash plate is a direct function of the fluid pressure actuating said valve element.

9. For an infinitely variable speed ratio hydromechanical transmission having an input shaft, an output shaft, a multi-cylinder hydraulic pump unit driven by said input shaft and a multi-cylinder hydraulic motor unit in drive relation with said output shaft, at least one of said units being of variable displacement with a tiltable swash plate axially rotatable with one of said shafts, said units being interconnected operatively for transmitting power hydromechanically from said input shaft to said output shaft, a control means for selectively varying the tilt angle of said swash plate comprising: a control body axially rotatable with said swash plate, a displacement control ram disposed in said body operatively connected for tilting said swash plate, a displacement control valve having an externally operable valve element communicatively connected to said ram, a source of fluid pressure connected to said control valve for energizing said ram, and a telemetric means operatively connected to said control valve and operatively connected to said swash plate for energizing said ram from said source until the tilt angle of said swash plate corresponds with a selected position of said valve element whereby the fluid displacement of said unit is a direct function of the position of said valve element.

10. For an infinitely variable speed ratio hydromechanical transmission having an input shaft and an output shaft, a multi-cylinder hydraulic pump unit driven by said input shaft and a multi-cylinder hydraulic motor unit in drive relation with said output shaft, at least one of said units being of variable displacement with a tiltable swash plate axially rotatable with one of said shafts, said units being hydraulically interconnected operatively for transmitting power hydromechanically from said input shaft to said output shaft, a control means for selectively varying the tilt angle of said swash plate comprising: a control body axially rotatable with said swash plate, a displacement control ram disposed in said body operatively connected for tilting said swash plate, a displacement control valve having an externally operable fluid pressure actuated valve element communicatively connected to said ram, a source of fluid pressure connected to said control valve for energizing said ram and a second source of selectively variable fluid pressure connected to said control valve for actuating said valve element to a selected position whereby said ram is energized to move said swash plate to a tilt angle corresponding to the position of said valve element for controlling the displacement of said unit.

11. For an infinitely variable speed ratio hydromechanical transmission having an input shaft and an output shaft, a multi-cylinder hydraulic pump unit driven by said input shaft and a multi-cylinder hydraulic motor unit in drive relation with said output shaft, at least one of said units being of variable displacement with a tiltable swash plate axially rotatable with one of said shafts, said units being hydraulically interconnected operatively for transmitting power hydromechanically from said input shaft to said output shaft, a telemetric control with follow-up means for selectively varying the tilt angle of said swash plate comprising: a control body axially rotatable with said swash plate, a displacement control ram disposed in said body operatively connected for tilting said swash plate, a displacement control valve having an externally operable valve element communicatively connected to said ram, and a source of fluid pressure connected to said control valve for energizing said ram whereby said ram is energized to move said swash plate to a tilt angle corresponding to the position of said valve element for controlling the displacement of said unit.

References Cited in the file of this patent

UNITED STATES PATENTS

| | | |
|---|---|---|
| 1,762,534 | Sorensen | June 10, 1930 |
| 1,840,872 | Rayburn | Jan. 12, 1932 |
| 2,784,554 | Badalini | Mar. 12, 1957 |
| 2,788,636 | Badalini | Apr. 16, 1957 |